(12) United States Patent
Hatcher

(10) Patent No.: US 6,224,103 B1
(45) Date of Patent: May 1, 2001

(54) CONTROL SYSTEM FOR ELECTRICALLY-OPERATED TRAILER LANDING GEAR

(76) Inventor: Edwin Bruce Hatcher, c/o Rte. 3, Box 3023, Wayne, WV (US) 25570

( * ) Notice: Subject to any disclaimer, the term of this patent is extended or adjusted under 35 U.S.C. 154(b) by 0 days.

(21) Appl. No.: 09/192,468

(22) Filed: Nov. 16, 1998

(51) Int. Cl.$^7$ ...................................................... B60S 9/99
(52) U.S. Cl. ................................... 280/766.1; 280/763.1; 280/764.1; 254/419
(58) Field of Search ............................... 280/763.1, 764.1, 280/765.1, 766.1, 6.153; 254/419

(56) References Cited

U.S. PATENT DOCUMENTS

| | | |
|---|---|---|
| 1,370,393 | 3/1921 | Yantis . |
| 2,523,962 * | 9/1950 | Mahaffey et al. .................... 254/419 |
| 2,817,493 | 12/1957 | Belcher .................................. 254/86 |
| 2,875,980 * | 3/1959 | Grace .................................. 254/419 |
| 3,117,766 | 1/1964 | Ketel ..................................... 254/86 |
| 3,136,527 | 6/1964 | Griffis .................................. 254/86 |
| 3,201,087 * | 8/1965 | Dalton ................................ 254/419 |
| 3,402,915 | 9/1968 | Dalton .................................. 254/86 |
| 3,628,811 | 12/1971 | Rivers ................................. 280/421 |
| 4,097,840 | 6/1978 | Chappelle ............................. 340/52 |
| 4,116,315 | 9/1978 | Vandenberg ...................... 192/48.92 |
| 4,129,322 * | 12/1978 | Kuntz, Jr. ............................. 254/419 |
| 4,206,491 * | 6/1980 | Ligman et al. ...................... 361/172 |
| 4,312,520 | 1/1982 | Burman ................................ 280/765 |
| 4,345,779 * | 8/1982 | Busby ................................ 280/766.1 |
| 4,400,986 | 8/1983 | Swanson et al. ....................... 74/128 |
| 4,402,526 | 9/1983 | Huetsch ............................. 280/766.1 |
| 4,466,637 | 8/1984 | Nelson ............................... 280/766.1 |
| 4,863,184 | 9/1989 | Mena .................................... 280/475 |
| 4,903,977 | 2/1990 | Baxter ................................... 280/475 |
| 5,004,267 | 4/1991 | Busby ................................ 280/766.1 |
| 5,050,845 | 9/1991 | Aline et al. ........................... 254/419 |
| 5,299,829 | 4/1994 | Rivers, Jr. et al. ............... 280/766.1 |
| 5,312,119 * | 5/1994 | Schneider et al. ..................... 280/6.1 |
| 5,426,961 | 6/1995 | Rimbaud et al. ....................... 70/237 |
| 5,451,076 | 9/1995 | Burkhead .......................... 280/776.1 |
| 5,575,493 * | 11/1996 | Scwhartz et al. ................. 280/763.1 |
| 5,905,356 * | 5/1999 | Wells ....................................... 320/2 |
| 5,911,437 * | 6/1999 | Lawrence ......................... 280/766.1 |

* cited by examiner

Primary Examiner—J. J. Swann
Assistant Examiner—James S. McClellan
(74) Attorney, Agent, or Firm—Alfred J. Mangels

(57) ABSTRACT

A powered landing gear drive system for a trailer for selectively extending and retracting the landing gear legs of the trailer. An electric motor is powered by a battery carried by a tractor or by the trailer and provides the power for an electric motor. A control system is provided as a security measure to permit limited, coded entry access to the system, and motor operating parameters are sensed to prevent exceeding operating limits of the system. The powered landing gear system can be provided as original equipment, or it can be retrofitted to existing trailers to permit powered landing gear operation.

18 Claims, 16 Drawing Sheets

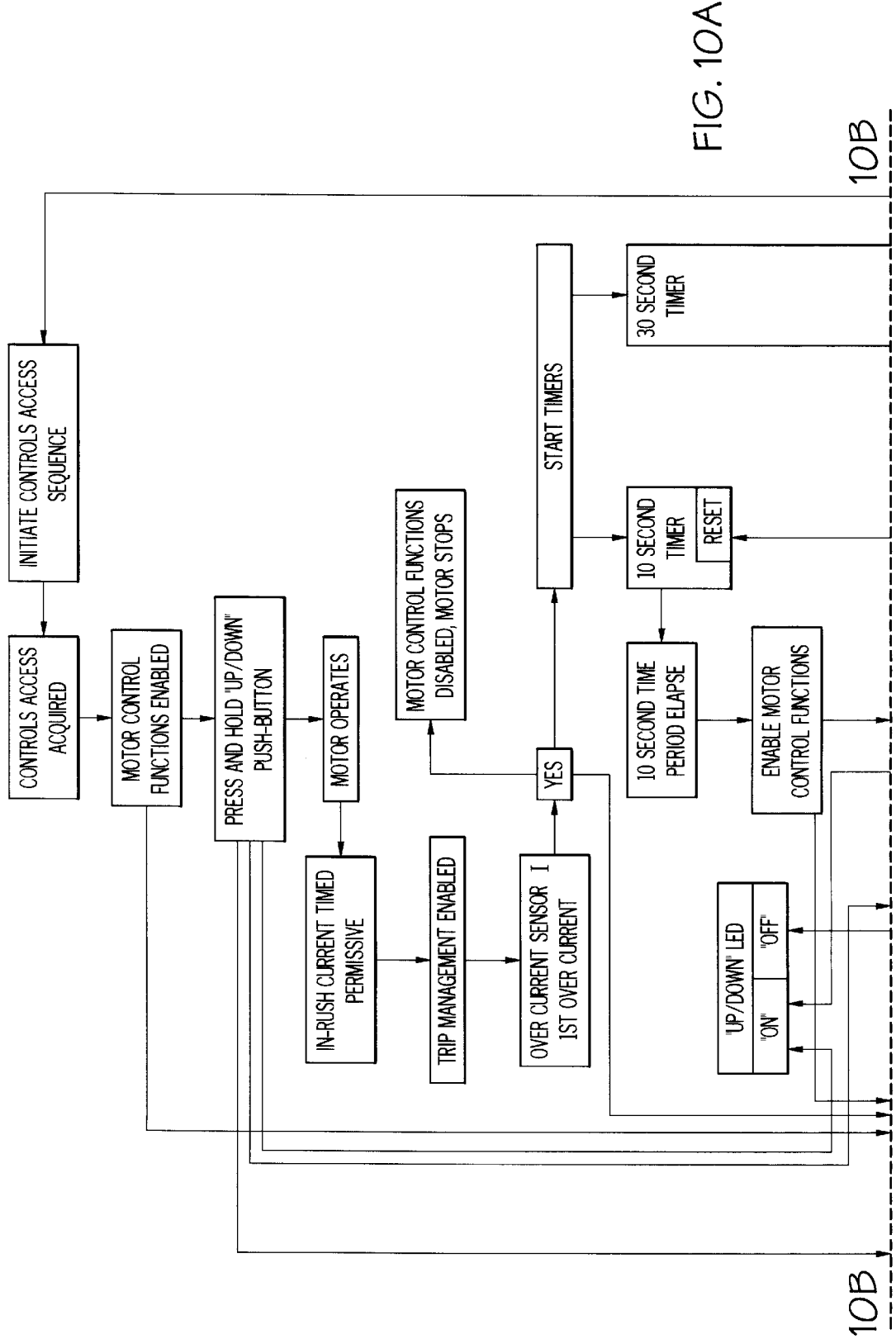

CONTROL SYSTEM FOR ELECTRICALLY-OPERATED TRAILER LANDING GEAR

BACKGROUND OF THE INVENTION

1. Field of the Invention

The present invention relates to a landing gear arrangement for a truck trailer of the type adapted to be removably connected with a tractor for transportation purposes. More particularly, the present invention relates to an improved, power driven landing gear system whereby the landing gear is operable by an electric motor that is controlled by a specially designed control system.

2. Description of the Related Art

Trailers of the type adapted for the transportation of goods are configured to be removably connectable with a tractor that includes the power plant for propelling the combined tractor and trailer. The tractor and trailer each include a component of a so-called fifth-wheel structure for effecting a secure connection between the tractor and the trailer. A trailer includes two or more pairs of rear wheels, and a landing gear toward the front end of the trailer. When the trailer is disconnected from the tractor, the forward end of the trailer, the end closest to the fifth-wheel connection, is supported by the landing gear legs, which can include at their lowermost ends either small wheels or pivotally supported pads. The landing gear legs are extendable and retractable, relative to the trailer frame, between an extended position and a retracted position. When the trailer is connected with a tractor the landing gear wheels are retracted, so that the front end of the trailer is supported by the tractor on the fifth wheel arrangement. And when the trailer is intended to be separated from the tractor the landing gear legs are extended to support the front end of the trailer to maintain the trailer bed in a substantially level position while the trailer is stationary and not connected with a tractor.

Most generally, the tractor landing gear is manually operated by means of a hand crank. The operator turns a crank in one direction or another either to extend the landing gear legs or to retract them, depending upon whether the trailer is connected with a tractor or not connected with a tractor. The hand crank operates through a reduction gear drive system to reduce the effort needed to cause the landing gear to extend or retract. However, despite the reduction gear drive, the effort required to extend the landing gear, in preparation for hook-up of the trailer with a tractor, is still a difficult task, particularly when the trailer is fully loaded with a heavy load. Thus, truck drivers and others who operate the trailer landing gear hand crank are sometimes injured as a result of the effort required to elevate a fully loaded trailer. Improper or careless cranking could result in back, arm, or hand injuries to the person operating the cranking mechanism.

In addition to the possibility of operator injury, improper positioning of the trailer front end during manual cranking of the landing gear extension and retraction system sometimes results in fifth-wheel damage. Generally, the tractor is connected with the trailer by backing the tractor toward the front end of the trailer to effect a connection by engaging the tractor portion and the trailer portion of the fifth wheel structure. Sometimes that connection attempt involves the application of ramming techniques whereby the tractor fifth wheel element is rammed into the trailer fifth wheel element during the tractor-to-trailer hook-up procedure. And if the trailer landing gear has not been manually extended a sufficient amount, to elevate the front of the trailer to a suitable elevation, ramming of the tractor to the trailer to connect the fifth-wheel arrangement could result in significant damage to the fifth-wheel system. Such improper positioning of the trailer sometimes results because of the difficulty involved in hand cranking a heavily loaded trailer to the correct hook-up height.

In addition to possible fifth-wheel damage, an improperly positioned trailer landing gear could also experience landing gear damage, sometimes called fold-out. Such damage can also occur because of the ramming technique used in the tractor-to-trailer hook-up procedure when the landing gear has not been properly extended to the correct position for permitting a smooth and clean hook-up. Many times when such fold-up occurs in the landing gear, both the trailer and the cargo it contains can sustain damage. Because of such trailer damage, it becomes necessary for the trailer to be taken out of service until a repair can be effected. Consequently, the trailer operator can experience operating losses because of such damage, in addition to possibly losing business because of too frequent incidents involving cargo damage. Accordingly, it is desirable to provide a power operated landing gear system to avoid the need for manual cranking, and to enable the landing gear to be easily positioned by a suitable motor. In that connection, the provision of pneumatic or electric motors to operate trailer landing gear systems has been suggested in the past. For example, a pneumatically-operated trailer landing gear arrangement is disclosed in U.S. Pat. No. 5,451,076, which issued on Sep. 19, 1995, to Paul Burkhead. That patent describes a pneumatic actuator for a trailer landing gear reduction assembly for raising or lowering of the landing gear of a trailer and to replace the hand crank. Additionally, in U.S. Pat. No. 4,466,637, which issued on Aug. 21, 1984, to Carl A. Nelson, there is disclosed a landing gear drive arrangement that includes an electric motor carried on the trailer frame and operable to power the landing gear between extended and retracted positions.

Although powered trailer landing gear arrangements have been disclosed in the past, they have not been widely adopted commercially. Additionally, the known powered landing gear drive arrangements are relatively unsophisticated and do not include safeguards to permit unauthorized operation of the landing gear drive system, which could make it easy for someone to steal a trailer along with its contents. Furthermore, the systems disclosed in the patents identified above, as well as in other patents, do not include sufficient control features to avoid damage to the drive system caused by incorrect operating procedures.

It is therefore an object of the present invention to overcome the deficiencies of the known powered landing gear drive systems and to provide an improved powered landing gear drive system that incorporates control functions to permit operation of the system only by authorized operators and to include built-in safeguards to prevent damage or injury to persons or property stemming from the operation of such systems.

SUMMARY OF THE INVENTION

Briefly stated, in accordance with one aspect of the present invention, apparatus is provided for extending and retracted the landing gear of a truck trailer. The apparatus includes a trailer having a pair of landing gear legs that extend downwardly from the trailer frame adjacent to the forward end of the frame and to support the forward end of the trailer. The landing gear legs are moveable between an extended position and retracted position. An electric motor carried by the trailer is connected with the landing gear drive system for extending and retracting the landing gear legs. A gearbox is carried by the trailer and is operably coupled with the electric motor and with the trailer landing gear to transmit rotary power from the electric motor to the landing gear legs to selectively cause the legs to extend and retract. A motor control system is provided for controlling the access to and the operation of the motor. The motor control includes a keypad for entering access information and control instructions to the motor control system.

DESCRIPTION OF THE PREFERRED EMBODIMENTS

Figure 1:
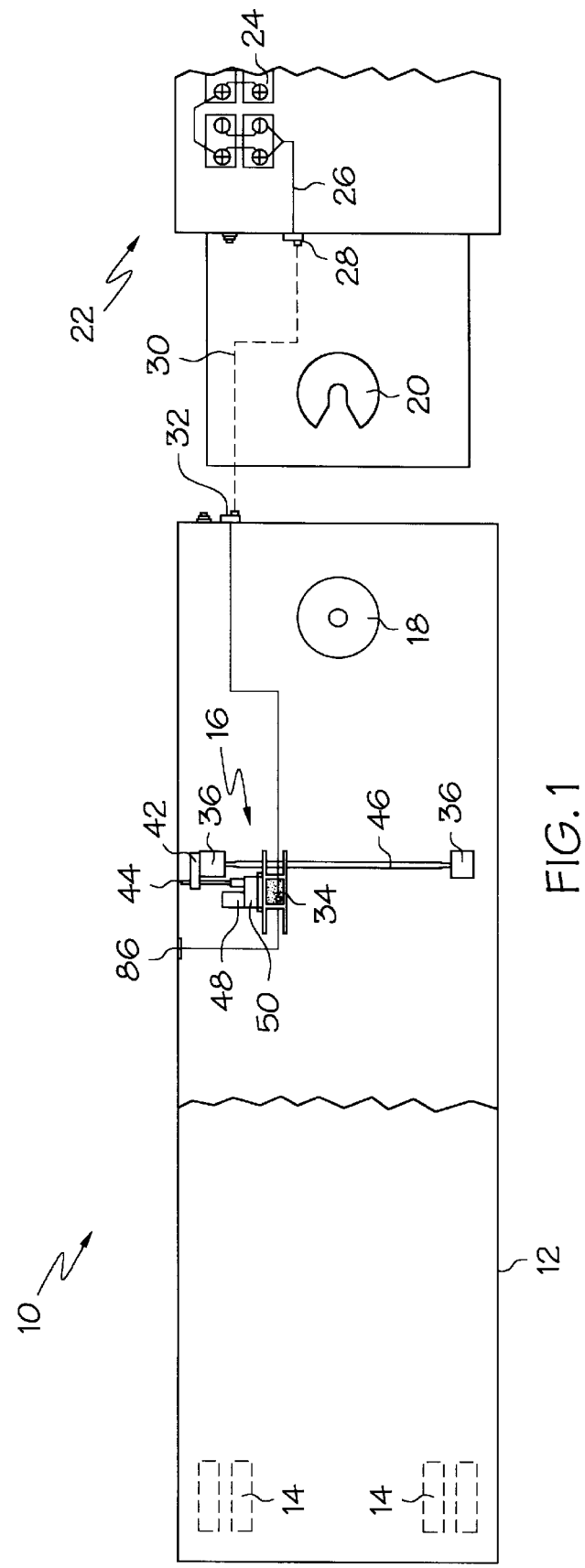
FIG. 1 is a fragmentary, top plan view of a trailer and tractor before their interconnection, with the trailer carrying a powered landing gear drive system in accordance with the present invention.
Figure 2:
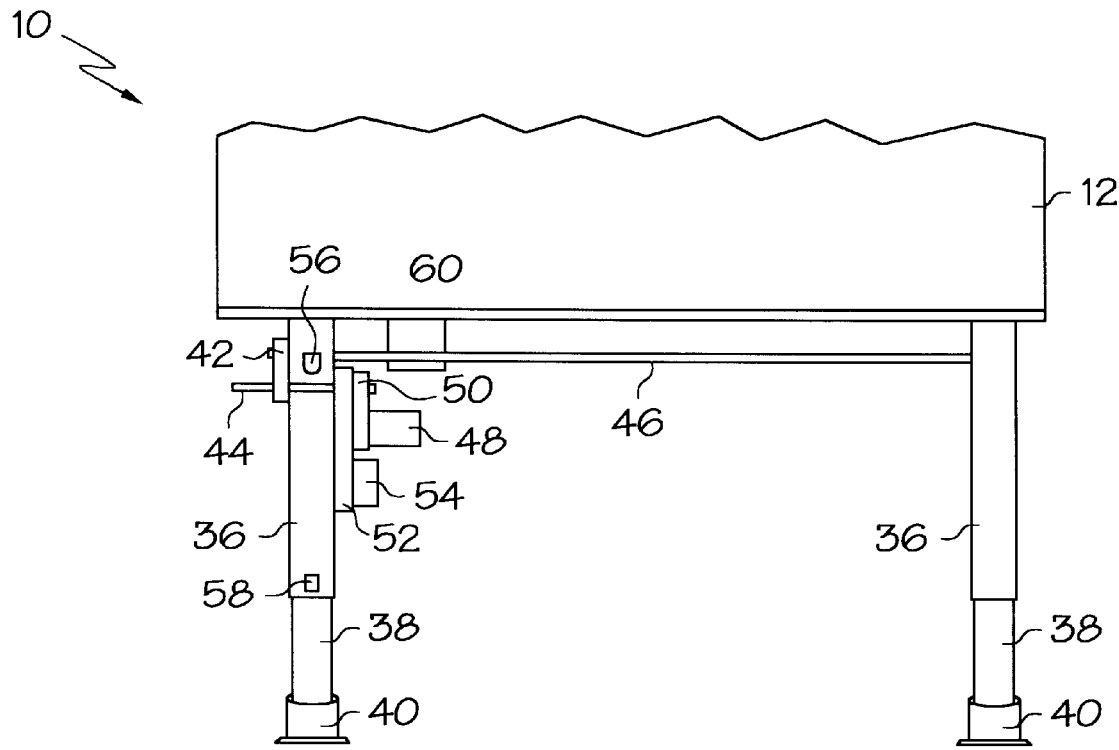
FIG. 2 is an enlarged, fragmentary front view of the front end of the trailer of FIG. 1 showing a landing gear system with a drive arrangement in accordance with the present invention.
Figure 3:
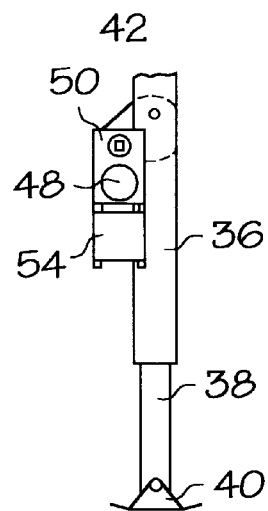
FIG. 3 is a fragmentary side view of one of the landing gear legs of the trailer shown in FIGS. 1 and 2, showing the mounting of the motor and the motor control.

Referring now to the drawings, and particularly to FIGS. 1 through 3 thereof, there is shown a trailer 10 having an elongated, generally rectangular trailer body 12 that is supported on two pairs of rear wheels 14 and a forwardly mounted landing gear system 16. Positioned at the forward end of trailer body 12 is a first part 18 of a fifth-wheel connection system that is adapted to be connected with a second part 20 of the fifth-wheel system that is carried by a tractor 22. Tractor 22 also carries a source 24 of electric power, such as one or more electric batteries that are connectable with a drive system for landing gear system 16. A suitable power cable 26 extends from power source 24 to a nose box 28 carried by tractor 22. A trailer power cable 30 extends from tractor nose box 28 to a trailer nose box 32. Alternatively, if desired, a battery 34 for power operation of landing gear system 16 can be carried by trailer 10, with a suitable connection (not shown) of battery 34 with the tractor's charging system (not shown) in order to maintain the charge necessary to provide sufficient power for the landing gear drive system. Additionally, as they are shown in FIG. 1 tractor 22 and trailer 10 are separated from each other, but they can be connected by backing the back portion of tractor 22 under the front portion of trailer 10 so that first part 18 and second part 20 of the fifth-wheel arrangement engage with each other to connect trailer 10 with tractor 22.

Landing gear system 16 includes a pair of laterally spaced, vertically extending, tubular outer leg members 36 that have their uppermost ends securely connected with the underside of trailer body 12. In that regard, the overall structure of a manually-operated trailer landing gear system is well known to those skilled in the art, as is also the manner in which the several elements of such a manually-operated trailer landing gear system are connected with trailer frame 12. Accordingly, because the present invention can be utilized with conventional, manually-operated landing gear systems, the ensuing description will be directed primarily to the major elements of a electrically-operated landing gear drive system in accordance with the present invention.

As best seen in FIGS. 2 and 3, each landing gear outer leg member 36 includes an inner leg member 38 that is axially slidably received within outer leg member 36. Each inner leg member 38 includes a conventional landing gear foot 40 that is pivotally carried at the lowermost end of inner leg member 38 to adapt to unevenness in the terrain on which trailer 10 is parked. Alternatively, instead of pivotally connected foot 40, inner leg members 38 can include at their lowermost ends a small wheel (not shown).

Within outer leg member 36 a suitable gearing arrangement (not shown) can be provided to enable inner leg member 38 to be selectively telescopically extended from or retracted into outer leg member 38. Suitable gearing arrangements for effecting such telescopic movements are not shown because they are known to those skilled in the art, but they can include a worm and worm gear, bevel gearing, or the like.

A speed reduction gearbox 42 is carried near the uppermost end of one of outer leg members 36 and on the outer surface thereof. Gearbox 42 includes an outwardly extending square end drive shaft 44 adapted to receive a hand crank (not shown) for enabling manual extension or retraction of respective inner leg members 38 relative to outer leg members 36. Gearbox 42 includes an output shaft (not shown) that is operatively coupled with the gearing within inner leg member 36 and that operates to extend or retract inner leg member 38. A cross shaft 46 extends between each of outer leg members 36 to transmit rotary power from gearbox 42 to both inner leg members, so they each extend and retract together and at the same rate. Thus, the application of rotary power through a hand crank serves to permit selective simultaneous extension or retraction of each of inner leg members 38.

Referring once again to FIG. 2, the powered landing gear drive system in accordance with the present invention includes an electric motor 48, a power drive gearbox 50 for providing a speed reduction arrangement for the motor output speed, and a mounting bracket 52 for mounting motor 48 and gearbox 50 to the upper portion of outer leg member 36. Mounting bracket 52 also supports a motor control module 54 that includes a number of control elements that will be hereinafter described. Power drive gearbox 50 can be a spur gear drive system, a planetary gear drive system, or any other form of drive system that provides the desired speed reduction. Additionally, gearbox 50 includes an output shaft (not shown) that is operatively connected with the leg extension and retraction system that is positioned internally of outer leg members 36, and in a manner that will be appreciated by those skilled in the art. Additionally, a pair of limit switches including an upper limit switch 56 and a lower limit switch 58 are provided on outer leg member 36 to sense when inner leg member 38 is in its innermost retracted position relative to outer leg member 36, or in its outermost extended position relative to outer leg member 38, respectively. Limit switches 56 and 58 provide a control signal to stop the operation of motor 48 when inner leg members 38 reach predetermined retracted and extended positions relative to outer leg members 36.

It will be appreciated that the overall manual landing gear operating system can be of a type that is commonly available. In that connection, the powered landing gear drive system in accordance with the present invention is intended to be connected to and to be usable with any standard, commonly available, manually operable landing gear structures. Thus, although the powered landing gear arrangement can be provided as original equipment on a trailer, the electrically operated landing gear drive in accordance with the present invention is also adapted to be installed as a retrofit arrangement on existing trailers having only manually operable landing gear systems.

Figure 4:
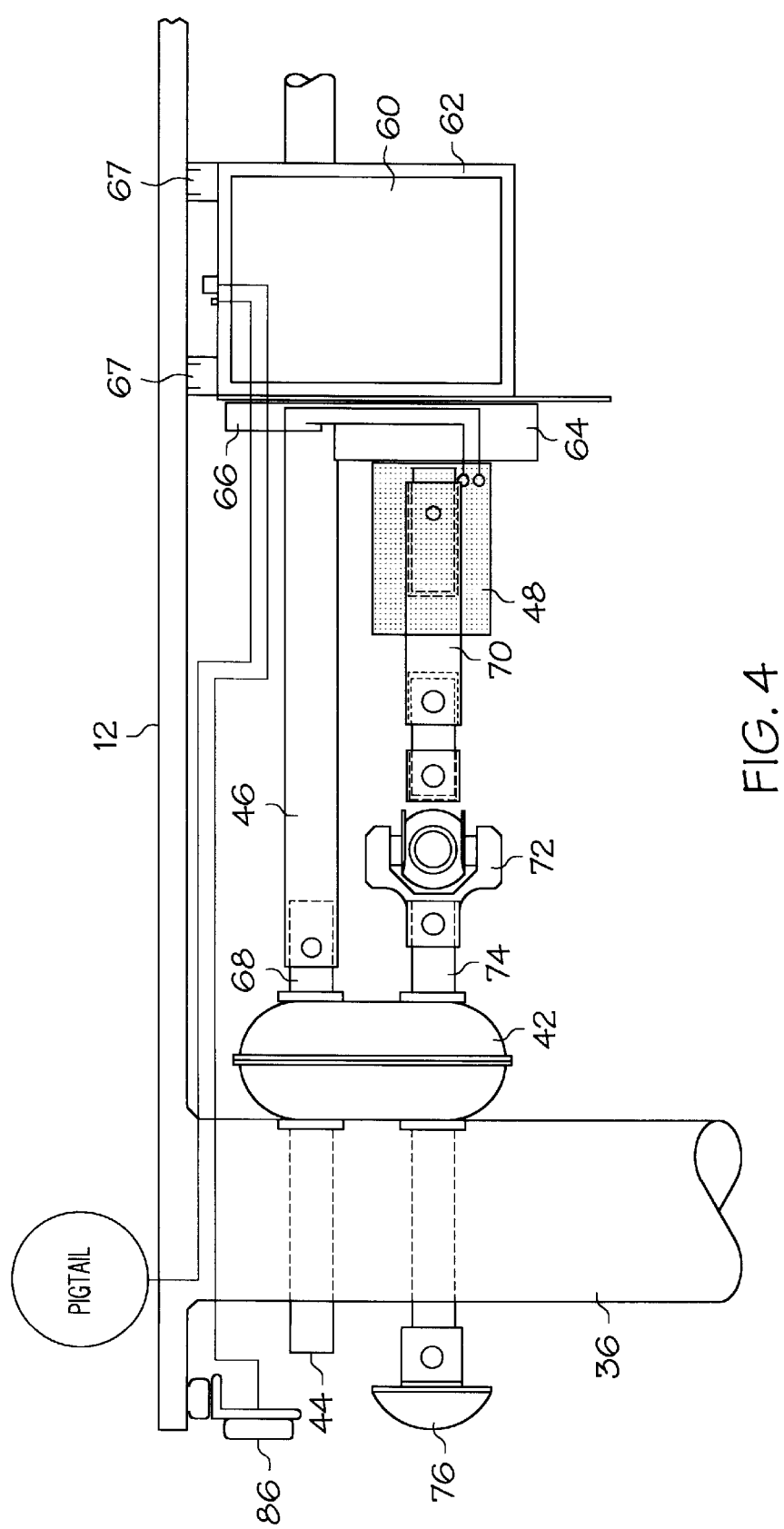
FIG. 4 is an enlarged, fragmentary view showing the overall arrangement of a powered landing gear drive system in accordance with the present invention, along with the manual crank shaft and connection with the drive system gearbox.

FIG. 4 shows an enlarged, fragmentary view of another form of landing gear drive system that incorporates both a manual crank drive arrangement as well as a powered drive arrangement. As shown, the system of FIG. 4 includes a storage battery 60 supported from trailer body 12 and carried by a suitable battery holder or case 62 carried by trailer body 12. A motor drive gearbox 64 is provided to enable the output speed of motor 48 to be reduced from about 3000 rpm to about 30 rpm before motor output torque is applied to the inner leg member extension and retraction system. In that regard, gearbox 64 can be a spur gear drive system, a planetary gear drive system, or any other form of drive system that provides the desired speed reduction. Electric motor 48, motor drive gearbox 64, and a motor control module 66 are each carried by and supported on battery holder 62, which is positioned inwardly of outer leg member 36 of one of the landing gear legs, and which, in turn, is supported from channel members 67 attached to trailer body 12.

Manual input speed reduction gearbox 42 is carried on and supported by outer leg member 36 and includes manual input drive shaft 44 and an output drive shaft 68. Cross shaft 46 is connected with output drive shaft 68 and extends to the opposite outer leg member (not shown). Motor drive gearbox 64 includes an output shaft 70 that is connected through a universal joint 72 with a power input drive shaft 74 that extends from manual gearbox 42. Additionally, a manually operable shift knob 76 is provided to enable gearbox 42 to be shifted from a high output speed mode that is utilized when the trailer is not in a loaded condition, to a low output speed, high output torque mode that is utilized when the trailer is in a loaded condition. Preferably, motor 48 has a weather-sealed case, and has a power output of about 2.5 horsepower. A suitable motor for the purpose is a 3,000 rpm, 12 volt, direct current, permanent magnet motor manufactured by Triem Company, of Carboro, N.C.

Figure 5:
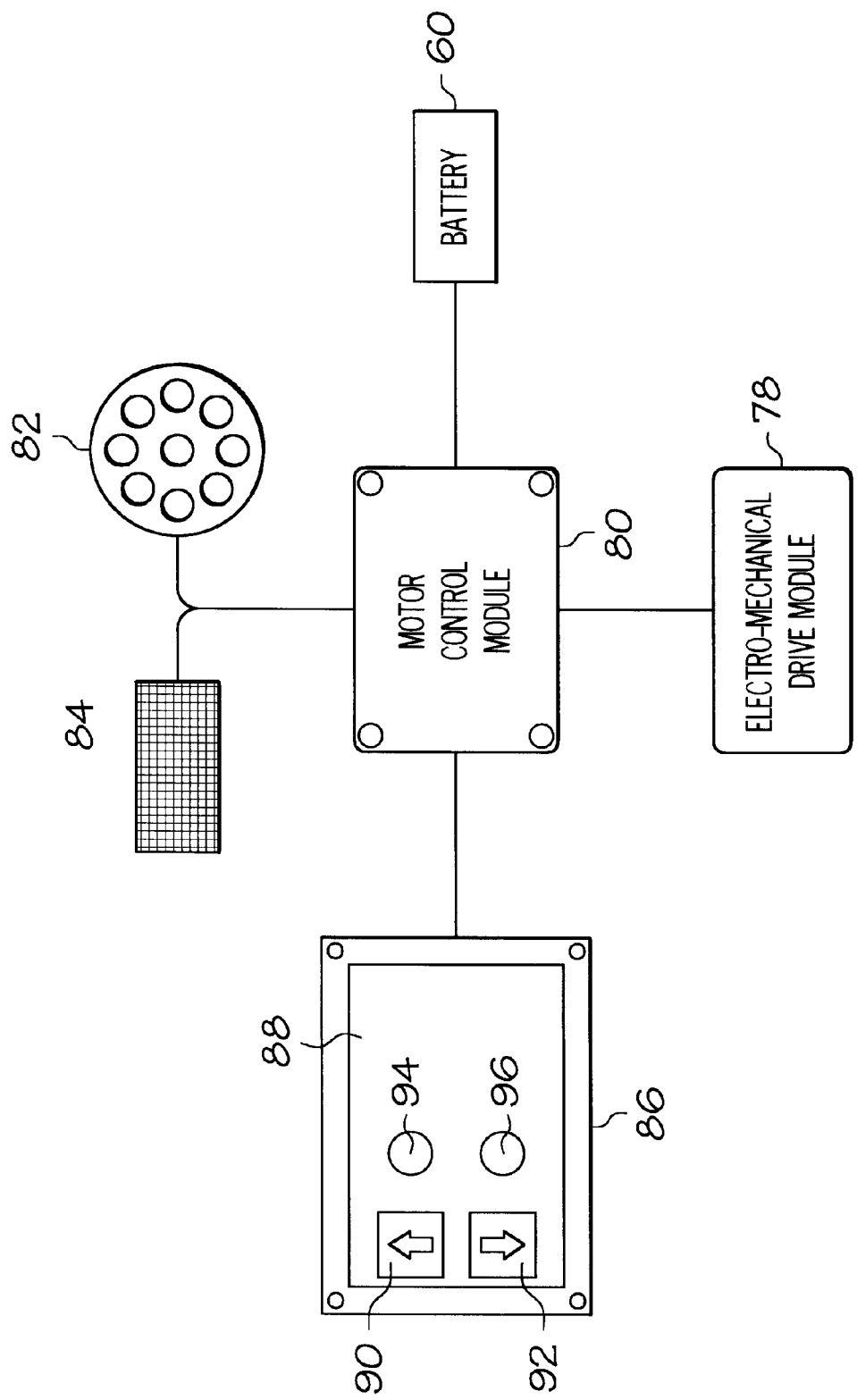
FIG. 5 is a control system block diagram for a powered landing gear system in accordance with the present invention.

The powered landing gear drive system in accordance with the present invention includes the elements shown in block diagram form in FIG. 5. Electromechanical drive module 78 includes motor 48 and interconnected motor gearbox 64. Motor 48 obtains its power through motor control module 80 that is connected with a suitable source of power, such as battery 60. Motor control module 80 can be connected with a tractor electrical system through a pigtail cable and associated connector 82, if desired. As noted earlier, the source of power for motor 48 can alternatively be a separate storage battery carried by trailer 10, such as battery 60 shown in FIG. 4. The electrical charge of the tractor's battery or of the trailer-mounted battery can be maintained by connecting the batteries with the tractor's charging system (not shown) in a manner known to those skilled in the art. As an alternative to sole reliance upon the tractor charging system to charge the trailer battery, a solar collector cell 84 can be provided at a suitable position on trailer 10 to enable trailer-mounted battery 60 to be maintained in a charged condition for an extended period of time, even while the trailer is not connected with the tractor's charging system. The trailer can thus be separated from the tractor, left in a separated condition for an extended period of time, and the landing gear system can be ready for powered operation whenever the need to do so arises.

Control of the powered landing gear drive system is effected through an input control module 86 that includes a housing 88 that carries an up push button 90 and a down push button 92. Pressing the up and down push buttons causes inner leg members 38 of the landing gear legs to retract and extend, respectively, relative to outer leg members 36. An up light emitting diode 94 is provided to indicate activation of up pushbutton 90 and a down light emitting diode 96 is provided to indicate activation of down pushbutton 92.

Figure 6:
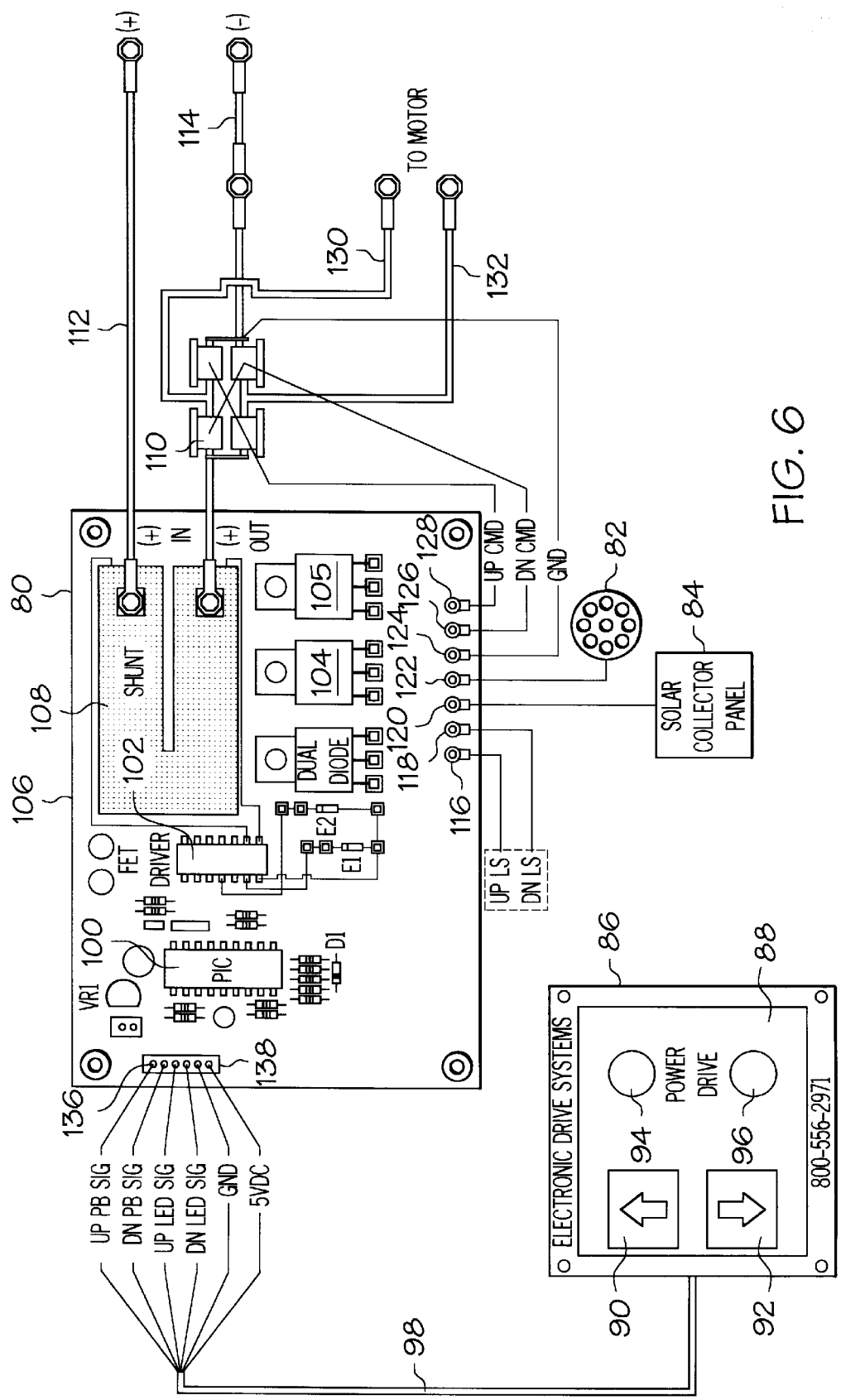
FIG. 6 is a schematic view of a motor control module in accordance with the present invention, and its interconnection with a power source and a control system keypad.

Referring now to FIG. 6, there is shown in diagrammatic form the overall internal structure of motor control module 80. Input control module 86 is connected with motor control module 80 through a suitable cable 98 that carries pushbutton signals from input control module 86 to motor control module 80, and to convey LED signals from motor control module 80 to the input control module 86. Motor control module 80 includes a power integrated circuit 100 and a field effect transistor driver 102 for driving two field effect transistors 104, 105 that are carried on circuit board 106. A shunt 108 is carried on circuit board 106 and is connected through a motor contactor assembly 110 to the respective positive and negative terminals 112, 114, respectively, of a power supply battery (not shown), which, as previously indicated, can be a tractor-mounted battery or a trailer-mounted battery. Other inputs to motor control module 80 include an up limit switch input signal applied to terminal 116, a down limit switch input signal applied to terminal 118, a solar collector panel input applied to terminal 120, an optional twelve-volt DC input 122 from the tractor battery, and a ground terminal 124. Output signals provided by motor control module 80 include an up signal terminal 126 and a down signal terminal 128, each of which is connected with motor contactor assembly 110 for controlling the flow of power to the motor through the motor operation cables 130, 132. Additional output signals from motor control module 80 include an up LED signal at up LED signal terminal 136 and a down LED signal at down LED signal terminal 138 to operate up and down LED's 94, 96, respectively.

Figure 7A:
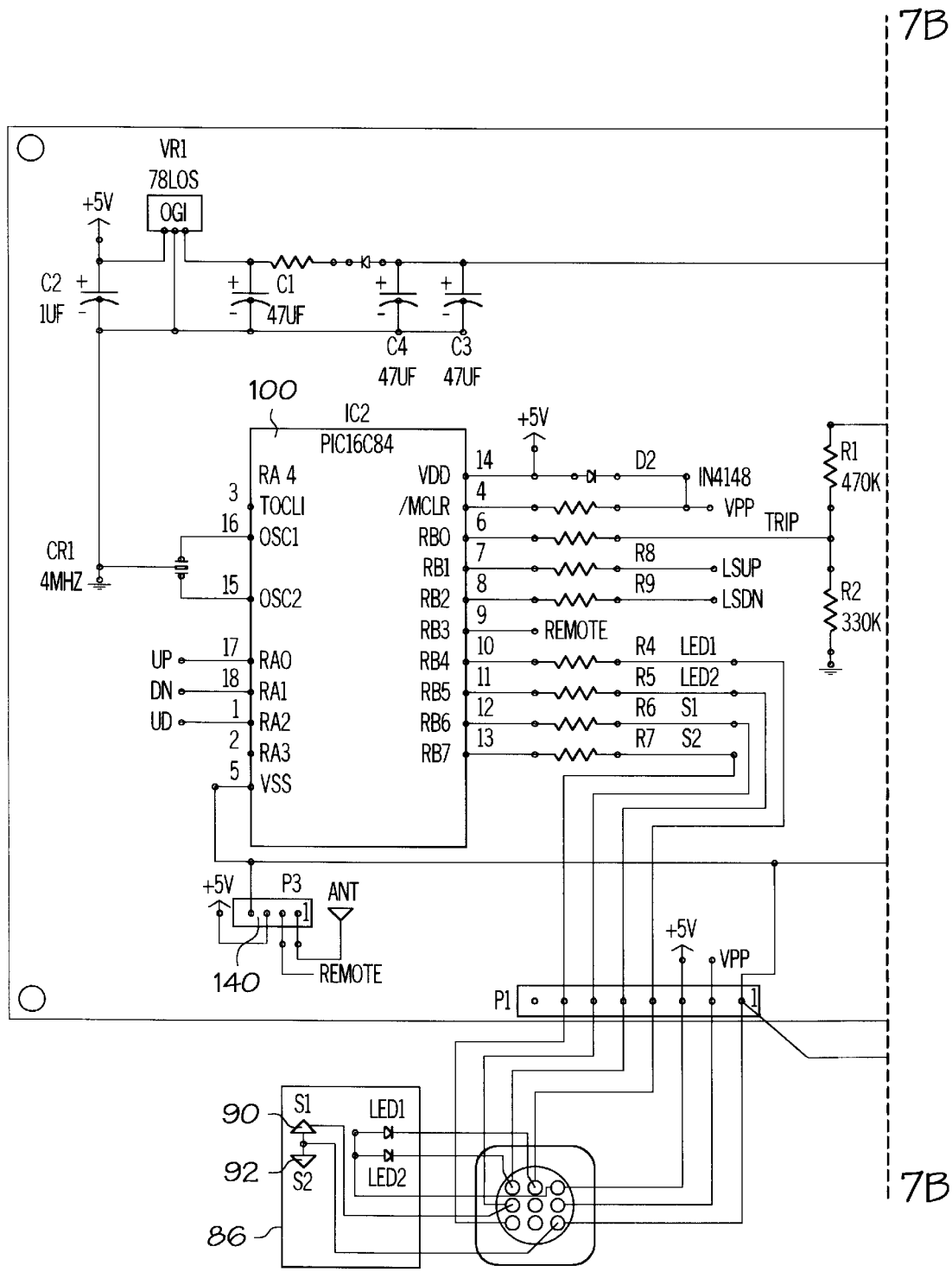
FIG. 7 is a schematic diagram of the motor control module circuitry for the motor control module illustrated in FIG. 6.
Figure 7B:
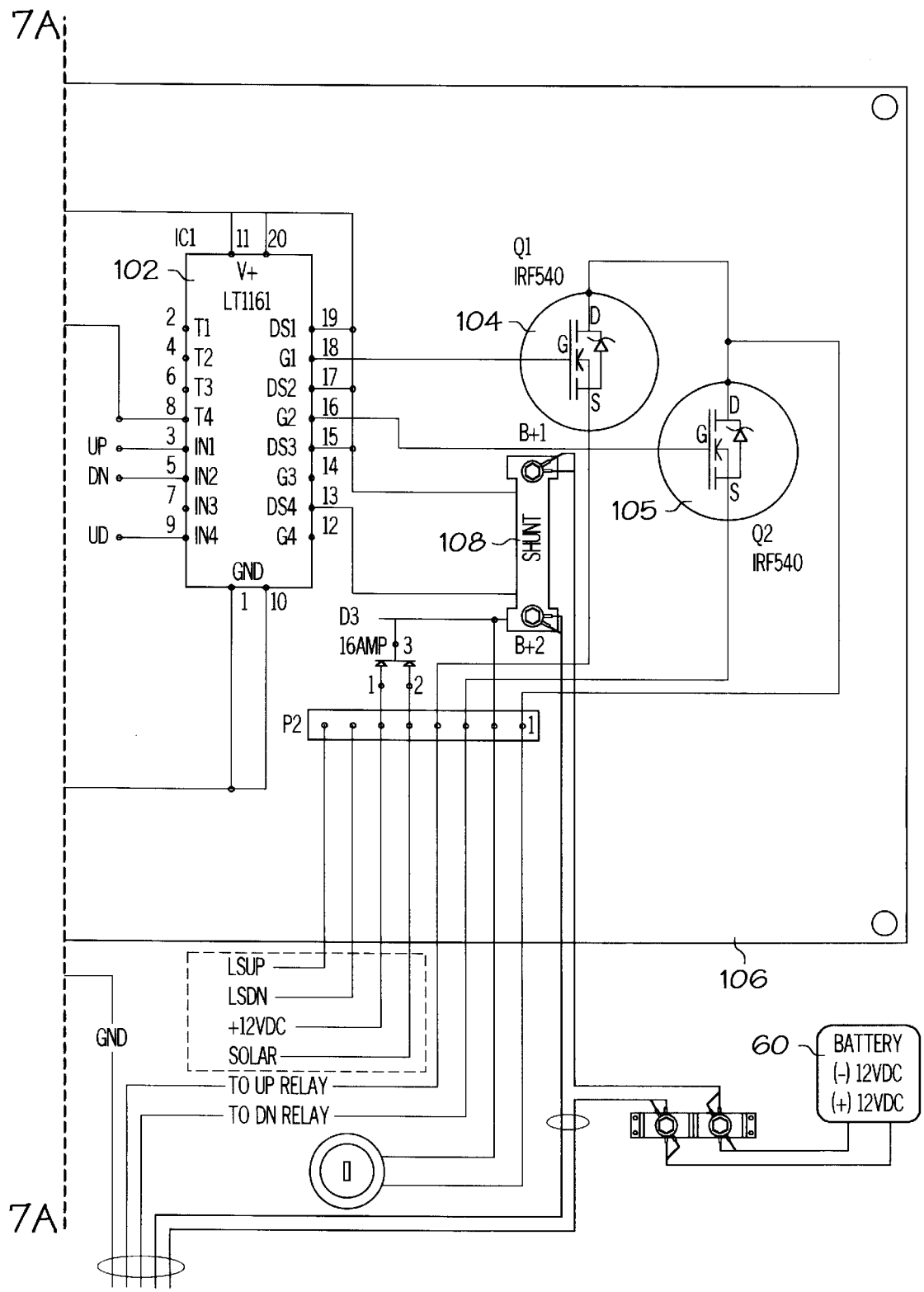
Figure 8A:
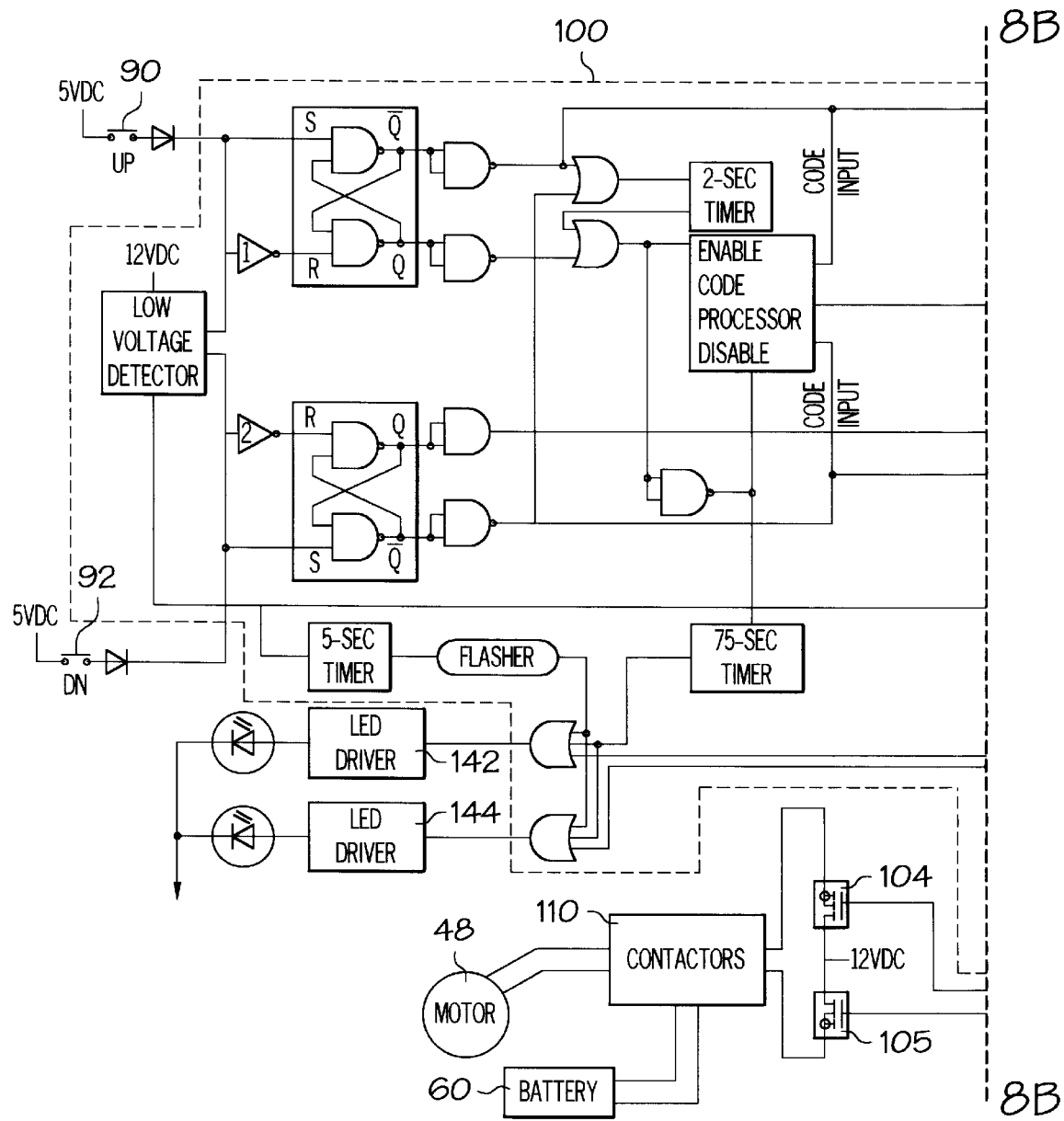
FIG. 8 is a schematic diagram of the circuit arrangement for a microprocessor of a type that can be included in a landing gear control system in accordance with the present invention.
Figure 8B:
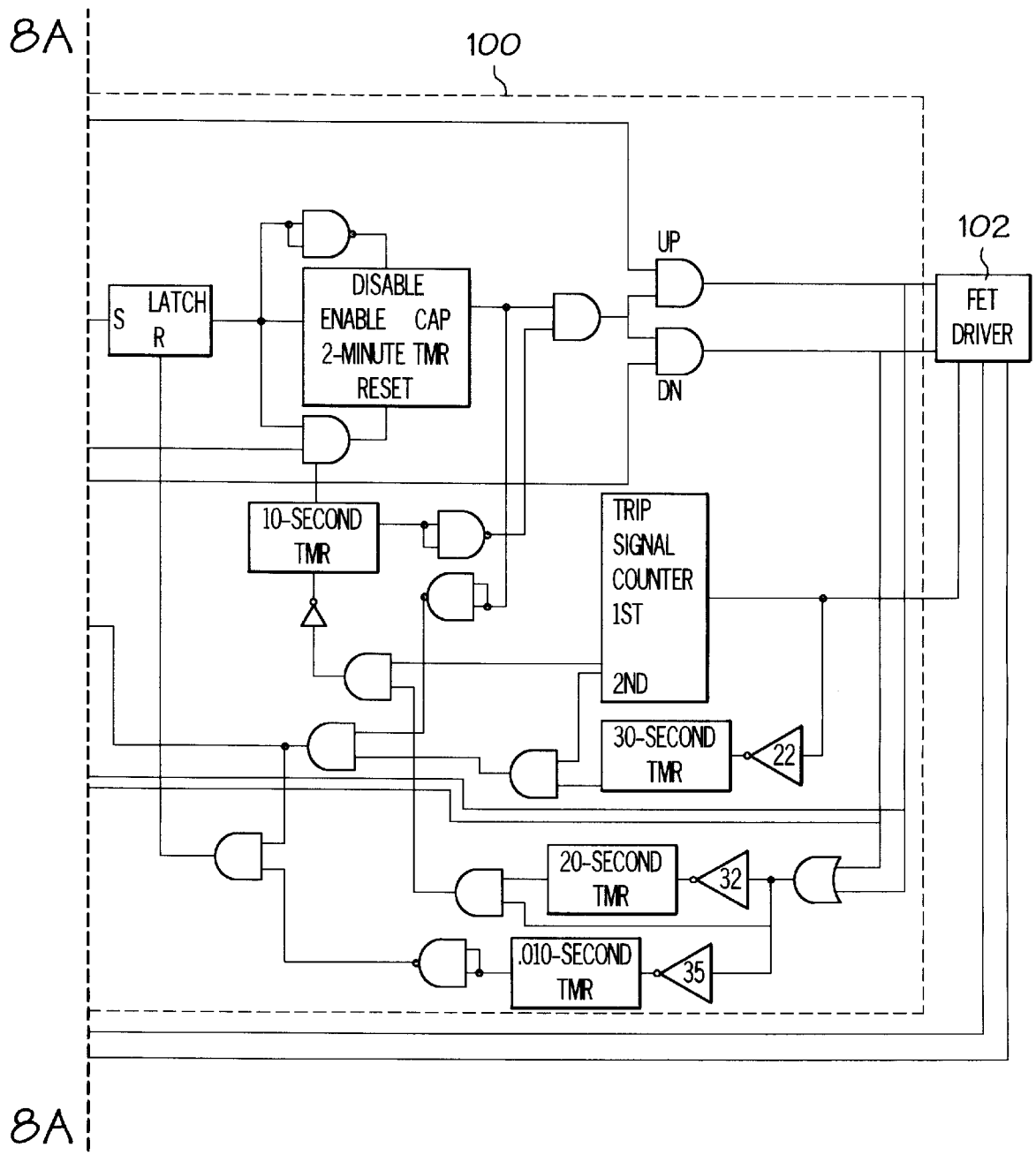

FIG. 7 shows in circuit diagram form the circuit elements and their interconnections for motor control module 80. As shown in FIG. 7, motor control module 80 can also include an antenna terminal 140 for conveying remote control signals from a remote, portable control panel (not shown), if desired. The structure and operation of such a remote control arrangement are known to those skilled in the art and will not be further described herein. Power integrated circuit 100 is a microprocessor that includes a plurality of logic gates, timers, and counters, and the interrelationship of those elements is shown in the circuit diagram of FIG. 8. The connection of power integrated circuit 100 with FET driver 102, with respective LED drivers 142, 144 and with up pushbutton 90 and down pushbutton 92 is also shown in FIG. 8, as is the connection with FET driver 102 of battery 60 motor contactors 110, and field effect transistors 104, 105. Additionally, FIG. 8 also shows the interconnections of the several timers that serve to control the operation of motor control module 80, as will hereinafter be described.

In operation, in order to gain access to the power-operated landing gear system of the present invention an operator is required to enter a valid access code that is recognized by the system. That arrangement provides security and helps to prevent theft of parked trailers in that only those having knowledge of a valid access code will be permitted to activate and operate the powered drive system. The access code is entered through input control module 80 by pressing the respective up pushbutton 90 and down pushbutton 92 in an appropriate sequence and within prescribed time intervals. Thus, one not authorized to operate the powered landing gear drive system will not know the proper access code, which is based upon a particular series of sequences of up and down push button operations, nor will he be able to attempt to determine an operable sequence of pushbuttons because the system includes timers that require the respective access code input signals to be entered within specific time periods. If not properly entered within the prescribed time periods, the system automatically resets itself and thus requires the person attempting to operate the system to begin all over again.

In a preferred system, a predetermined time interval, such as a two-second time interval, is prescribed between respective access code input entries. Thus, if the code input keys are not sequentially operated within two seconds of each other in a recognized, prescribed sequence, the system will automatically reset itself, thereby requiring another attempt to enter the correct access code in the correct sequence and within the prescribed time intervals. Unless the proper code sequence is timely entered, the system will continue to deny access and will continue to reset itself, thereby thwarting any attempt by an unauthorized individual to activate and obtain access to the system.

After a correct access code sequence is properly entered within the prescribed time intervals between individual access code input entries, a second timer, for example a two minute timer, begins to count down and if no additional system operation is initiated before the expiration of the two minute time period, the microprocessor will terminate access and will reset itself to the standby mode, waiting for the next activation access code entry sequence to begin. As will be appreciated by those skilled in the art, the time period that the second timer counts down can be programmable for other time periods, such as, say, eight minutes, to give the driver additional time before a system reset occurs.

The preferred powered landing gear drive system also includes an electronic overcurrent protection for the system drive motor. In that regard, high motor currents, above, say, 80 amps, and sustained for a period of time that exceeds a predetermined high current time period will trip a motor control function timer that prohibits continued motor operation for a predetermined first period of time, say ten seconds. The motor control function trip will also start a timer that will deactivate the system control functions if a second motor control function trip occurs within a second predetermined period of time, say a thirty second time interval. After system deactivation caused by two motor control function trips within a thirty second period, the system enables a code reset. As a result, the system controls must be reaccessed by again properly entering an authorized access code within the prescribed time limits. In connection with the overcurrent protection arrangement, the system includes an RC timing circuit to sense normal peak inrush motor current upon start-up so that an overcurrent rotection trip is not initiated during motor startup.

To protect the drive motor from damage occasioned by excessive operation of the motor, preferably the drive motor continuous operation time is limited to a predetermined time period, say twenty seconds. That time interval is sufficient to account for normal motor operation for high-speed extension or retraction of the landing gear to and from a fully retracted position to a position at which the landing gear footpads are on the ground. In a preferred system, operation of the motor to achieve that extent of extension or retraction will occur within a time interval of about four seconds. On the other hand, when the system is in a low gear operation mode, typically when the landing gear is to be extended while the trailer is loaded, the system is preferably configured to provide less than ten seconds of motor operation for effecting low speed extension of the landing gear. Accordingly, the twenty second timer is activated each time an up or down push button is pressed within the limited two minute operating time frame. Push button release before the twenty second timer times out will result in resetting of the twenty second timer. After motor cut-out because the twenty second time limit has been exceeded, release of the push button will reset the twenty second timer and allow another twenty second time period to begin, provided the second motor overcurrent trip has not activated. In that connection, the motor overcurrent trip takes priority over the twenty second timer reset.

Figure 9A:
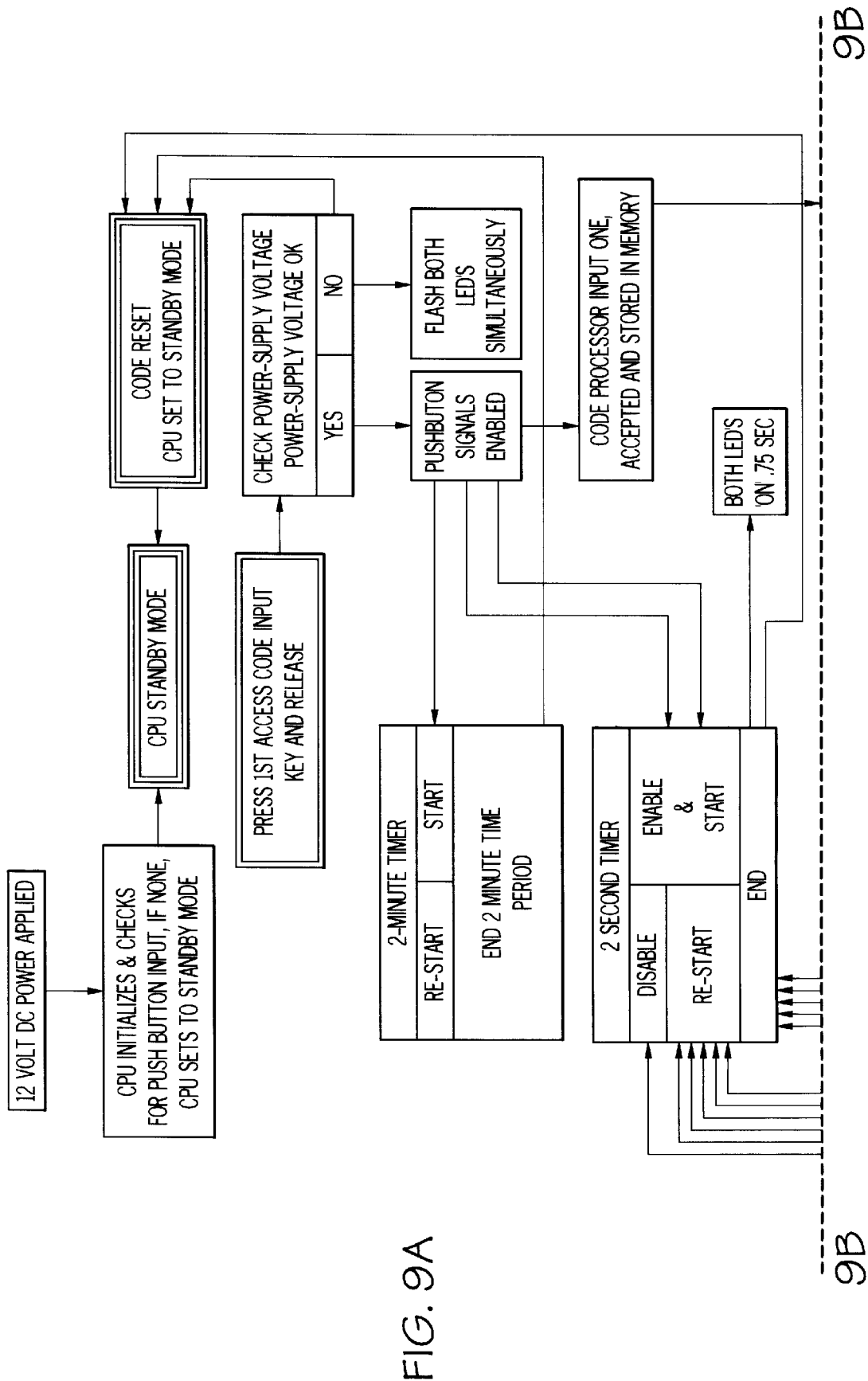
FIG. 9 is a flow chart showing the logic steps involved in providing coded access to a powered landing gear drive system in accordance with the present invention.
Figure 9B:
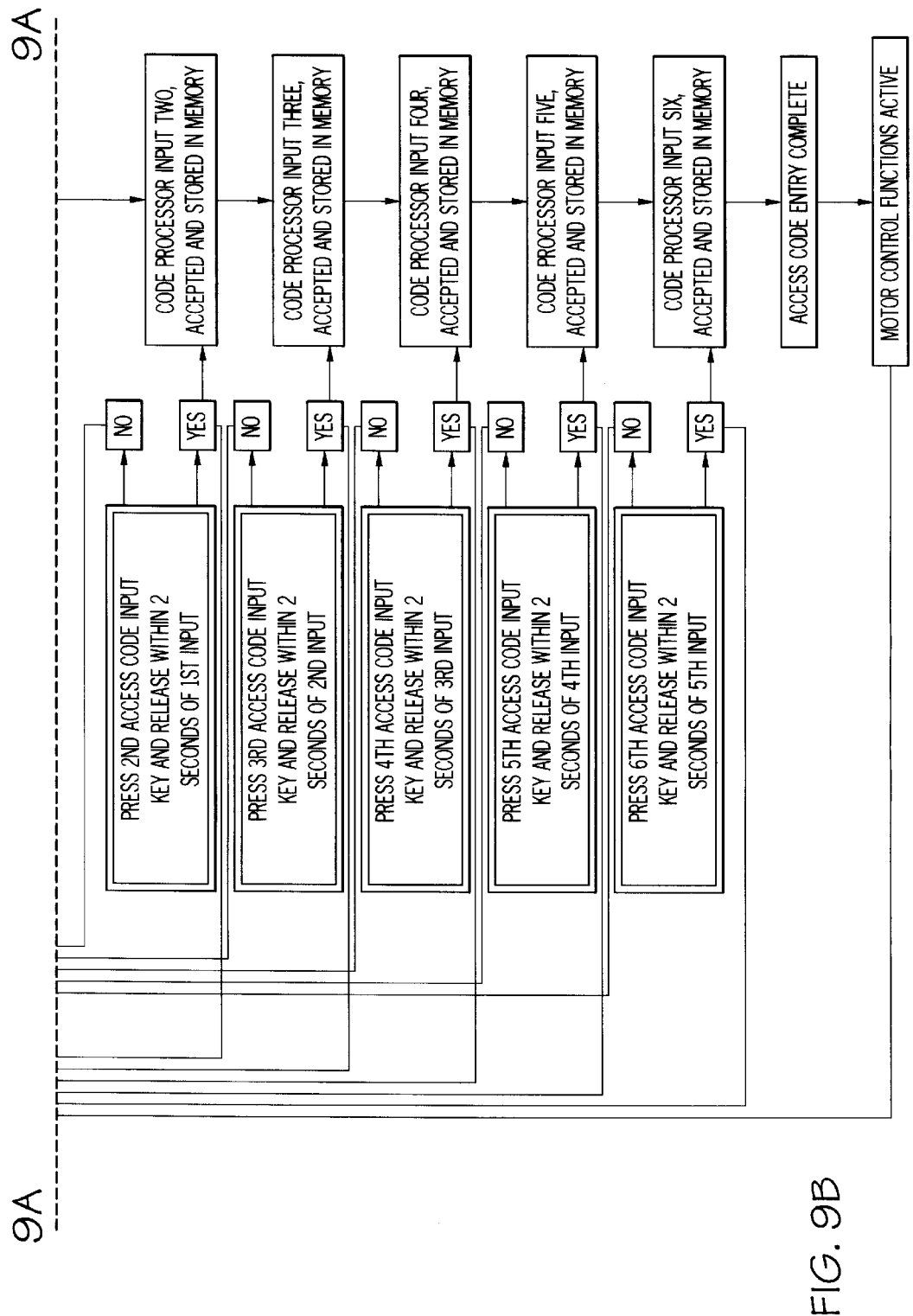
Figure 10B:
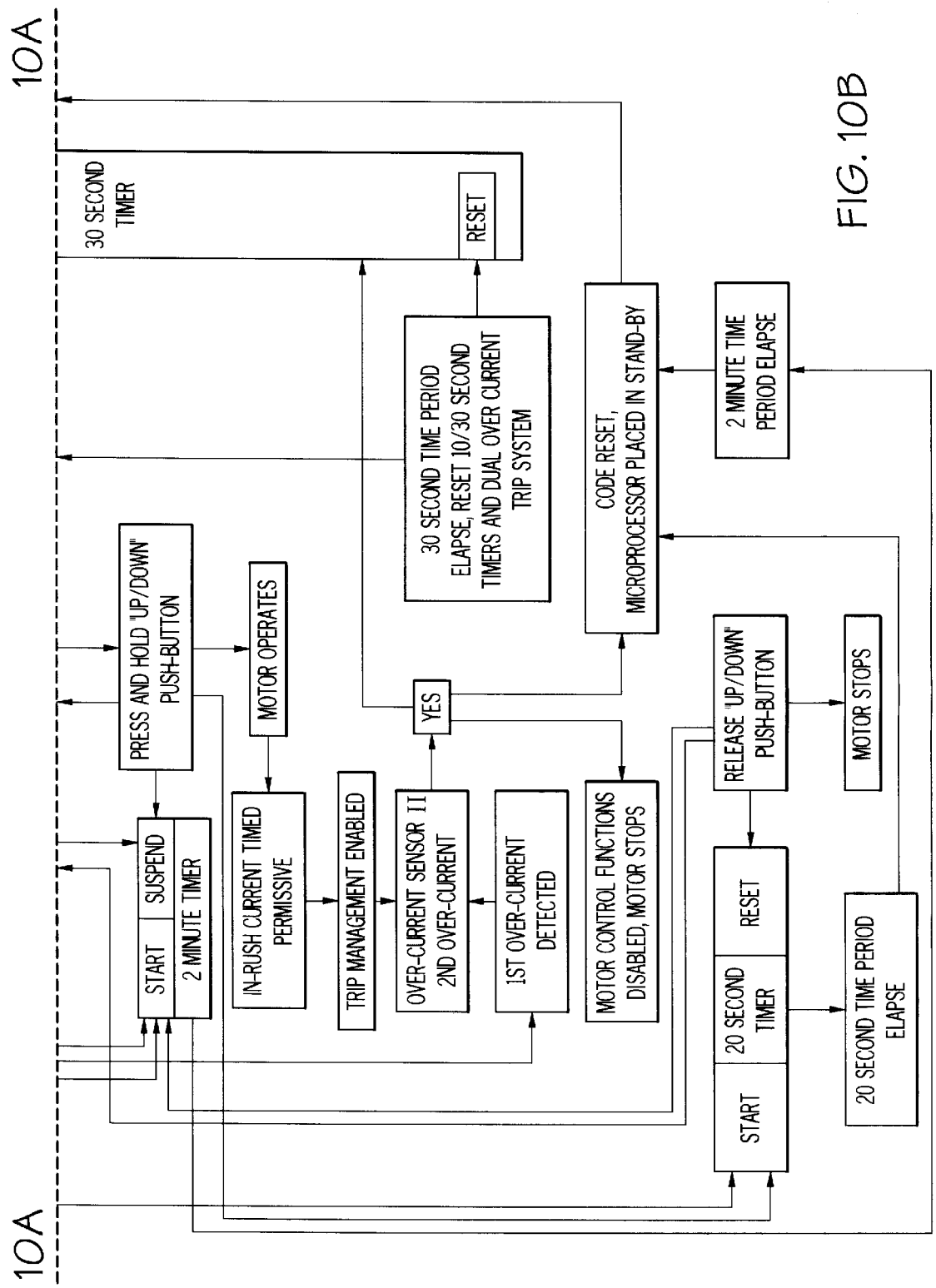
FIG. 10 is a flow chart showing the logic steps involved in a motor over-current control loop for a powered landing gear drive system in accordance with the present invention.

The system logic and sequence of steps for the operation of the coded access phase of the preferred system is shown in FIG. 9. Successful navigation of the coded access phase activates the microprocessor and enables the motor control to function, provided the proper access code pushbutton sequence has been entered within the prescribed code entry time intervals. As shown, a six-entry access code is preferred, and it is entered by depressing the up or down pushbuttons in the proper, predetermined sequence that defines an authorized access code. As shown, the LED'swill flash simultaneously if upon entry of the first access code digit the system detects that the supply voltage is below a predetermined value. Further, the LED'swill both be ON for 0.75 second if the two-second timer times out during the access code entry phase FIG. 10 shows the logic sequence and the steps the system executes when a motor overcurrent condition is sensed. If no overcurrent is detected, the motor operates to extend or retract the inner leg members in response to the up or down pushbutton activation.

Figure 11:
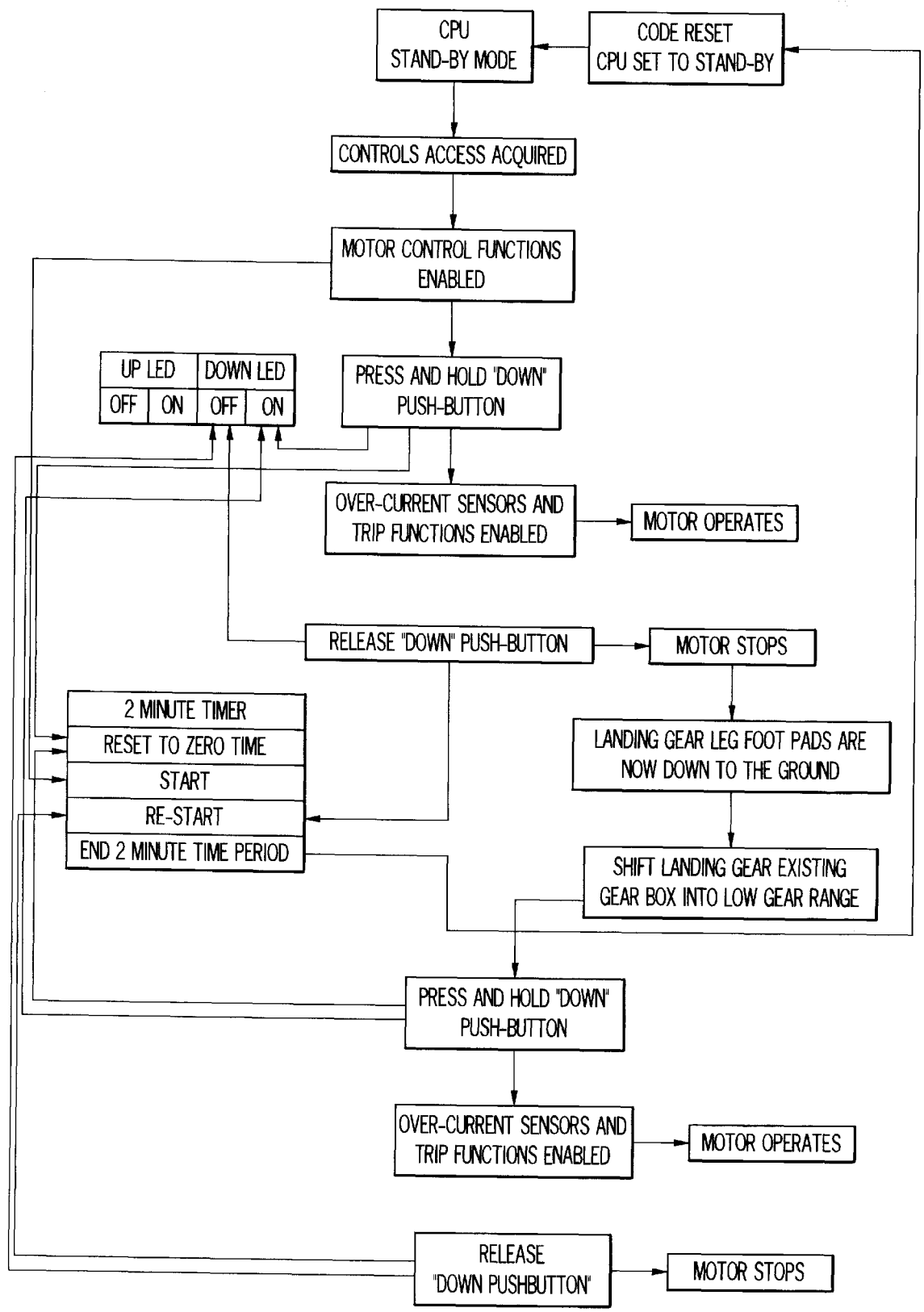
FIG. 11 is a flow chart showing the logic steps involved in the motor operation portion of the control system for a powered landing gear arrangement in accordance with the present invention when the landing gear of a loaded trailer is being extended.

FIG. 11 is a logic flow chart showing the motor operation steps during normal operation of the system, beginning with the landing gear in a fully retracted position and then lowering the landing gear when a loaded trailer is to be detached from a tractor. As shown, depressing the down pushbutton while the gearbox is in the high gear range causes the system to operate in a first, high speed mode for rapid extension of the landing gear legs. Rapid extension continues until just before the leg footpads touch the ground, at which point the down pushbutton is released. At that point, the landing gear gearbox is shifted into the low gear range and the down push button is again depressed to cause the landing gear legs to further retract, at low speed, and to elevate the trailer to thereby allow disconnection of the trailer from the tractor by supporting the front of the trailer by means of the landing gear. In that regard, the sequence of events illustrated in FIG. 11 does not include any timer resets or overcurrent trips of the nature hereinbefore described.

Figure 12A:
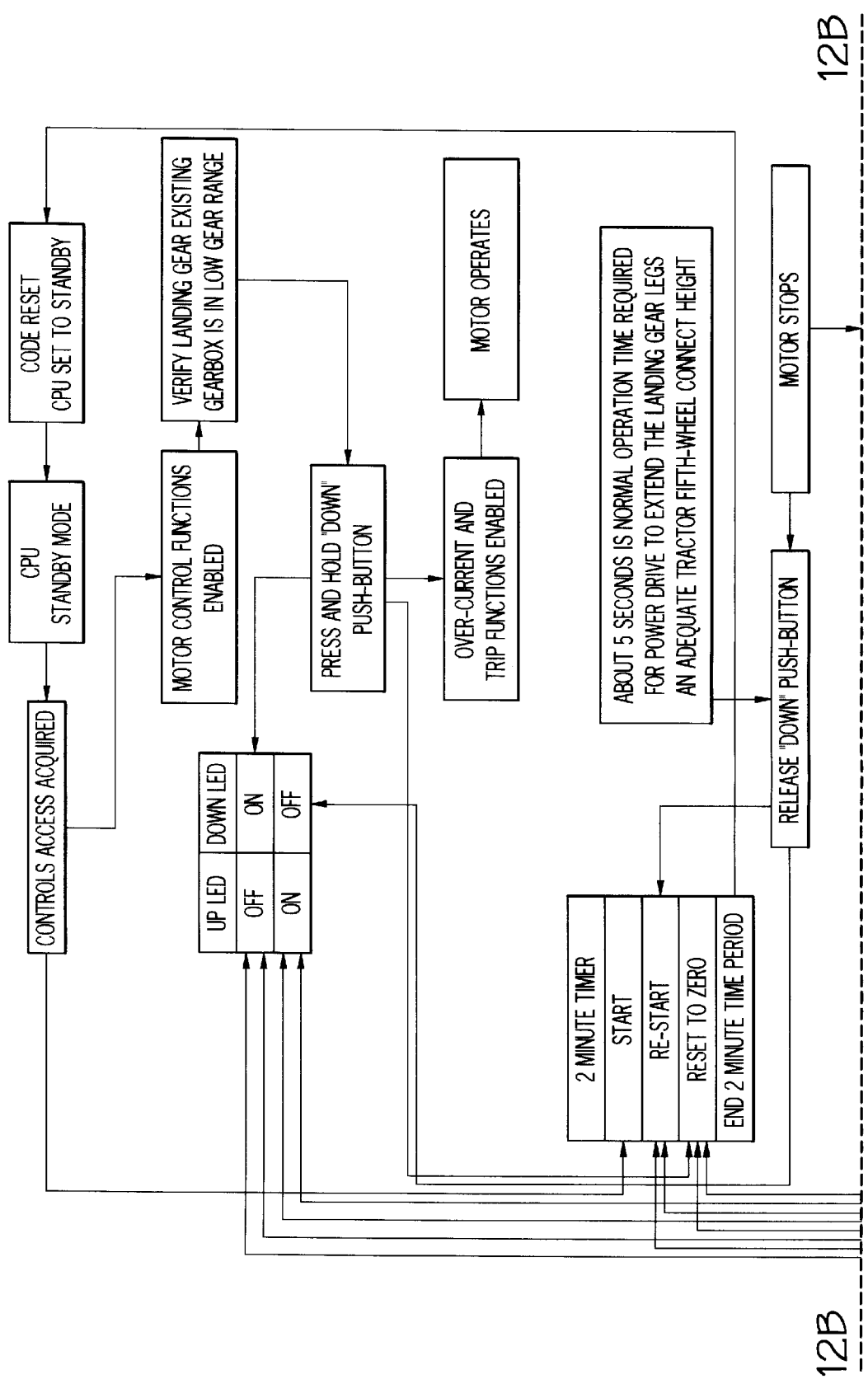
FIG. 12 is a flow chart showing the logic steps involved in the motor operation portion of the control system for a powered landing gear drive arrangement in accordance with the present invention when connecting a loaded, parked trailer with a tractor.
Figure 12B:
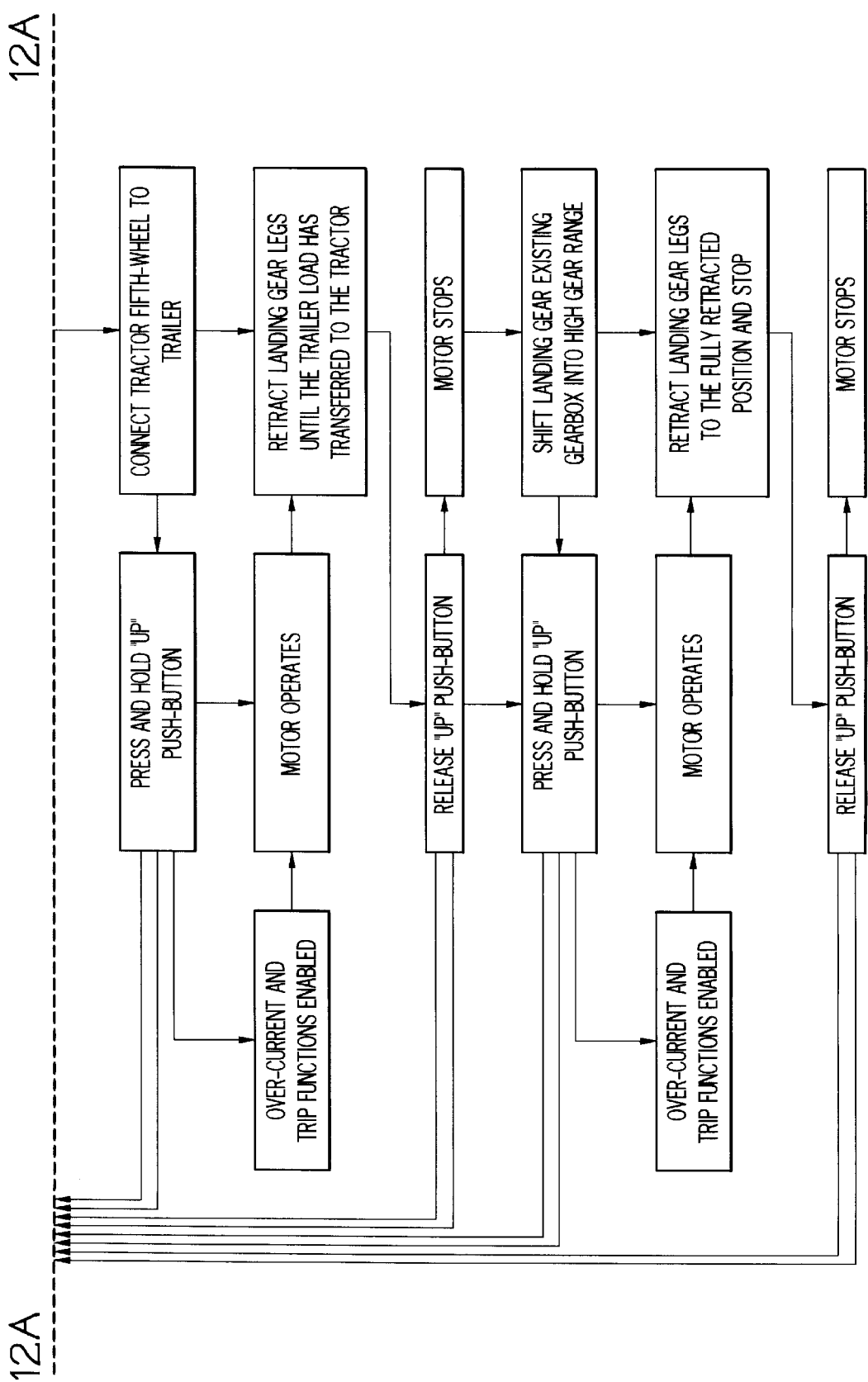

FIG. 12 shows the logic sequence and the steps involved in landing gear system motor operation for the condition where a loaded, parked trailer is not initially connected with a tractor. Because the trailer is loaded, the gearbox should be in the low gear range. The motor is activated by depressing the down pushbutton to extend the landing gear legs an adequate height to enable connection of the fifth-wheel elements to be made between the tractor and the trailer. After the landing gear has been sufficiently extended the down pushbutton is released. When the connection between the tractor and trailer has been effected, the up pushbutton can be depressed to retract the landing gear legs so that the trailer load at the front end of the trailer has been transferred to the tractor. At that point, the motor can be stopped by releasing the down pushbutton, at which point the landing gear gearbox can be shifted into high gear range, and the up push button again depressed in order to rapidly retract the landing gear legs to the fully retracted position. Again, the sequence of steps illustrated in FIG. 12 assumes normal operation, without any timer resets and without any overcurrent trips.

From the foregoing, it will be apparent to those skilled in the art that the system herein described permits convenient, powered operation of the landing gear of a trailer, to reduce the likelihood of injuries to the operator and damage to the trailer and its contents, that can result when the manual crank system is utilized. Additionally, it will be apparent that the system includes protective measures to avoid damage to the system components, and that the system provides security features that prevent unauthorized operation of the system.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Apparatus for extending and retracting a landing gear of a truck trailer that includes a trailer frame, said apparatus comprising:
    (a) a pair of landing gear legs extending downwardly from the trailer frame adjacent an end of the frame, wherein the landing gear legs are operable to support the forward end of the trailer frame and are movable between an extended position and a retracted position;
    (b) an electric motor carried by the trailer frame for extending and retracting the landing gear legs;
    (c) a first, speed reduction gearbox carried by the trailer frame and operably coupled with the electric motor and with the trailer landing gear to transmit rotary power from the electric motor to the landing gear legs to selectively cause the legs to extend and retract;
    (d) a motor control system for controlling the access to and the operation of the motor;
    (e) a keypad for entering an access code and control instructions to the motor control system;
    (f) an input control module included in the motor control system and operatively connected with the keypad for receiving a multi-component access code entered by a user through the keypad, the input control module including an access code entry timer for timing intervals between entry of individual access code components and for allowing system access when successive correct access code components are entered within predetermined time intervals between individual component entries; and
    (g) a source of electrical power coupled with the motor control system.

2. Apparatus in accordance with claim 1 wherein the keypad includes a pair of keys for initially entering an access code for activating the motor control system based upon a predetermined key operation sequence, and for subsequently also operating the landing gear in extension and retraction modes, wherein one key is operable to extend the landing gear legs and another key is operable to retract the landing gear legs.

3. Apparatus in accordance with claim 1 including reset means for resetting the motor control system and for initializing the access code entry timer when a delay between entry of individual access code components exceeds a predetermined time delay.

4. Apparatus in accordance with claim 1 wherein the motor control system includes an activity timer for measuring a time delay between acceptance of an entered access code and a subsequent activation of the electric motor.

5. Apparatus in accordance with claim 4 including reset means for resetting the motor control system to a standby mode and for initializing the access code entry timer when a measured activation time delay exceeds a predetermined activation time delay.

6. Apparatus in accordance with claim 1 wherein the motor control system includes motor current measuring means for measuring the current drawn by the motor during motor operation, and a motor overcurrent timer responsive to the current drawn by the motor for imposing a motor operation delay before the motor can again be energized after a predetermined motor overcurrent time has been exceeded.

7. Apparatus in accordance with claim 1 wherein the motor control system includes a motor operation timer for measuring the time the motor is in continuous operation, and reset means operable in response to a motor operation time that exceeds a predetermined continuous motor operation time to prevent motor operation for a predetermined motor off time.

8. Apparatus in accordance with claim 1 wherein the motor control system includes a battery voltage sensor, and reset means for preventing motor operation when battery voltage is less than a predetermined voltage value.

9. Apparatus in accordance with claim 1 including a second, shiftable gearbox that is a two speed gearbox for providing a first, low speed, high torque output and a second, high speed, low torque output for extending and retracting the landing gear legs at different speeds.

10. Apparatus in accordance with claim 4 wherein the motor control system includes motor current measuring means for measuring the current drawn by the motor during motor operation, and a motor overcurrent timer responsive to the current drawn by the motor for imposing a motor operation delay before the motor can again be energized after a predetermined motor overcurrent time has been exceeded.

11. Apparatus in accordance with claim 1 wherein the motor control system includes an activity timer for measuring a time delay and acceptance of an entered access code and a subsequent activation of the electric motor, and a motor current measuring means for measuring the current drawn by the motor during motor operation, and a motor overcurrent timer responsive to the current drawn by the motor for imposing a motor operation delay before the motor can again be energized after a predetermined motor overcurrent time has been exceeded, and a motor operation timer for measuring the time the motor is in continuous operation, and reset means operable in response to a motor operation time that exceeds a predetermined motor operation time to prevent motor operation for a predetermined motor off time, and a battery voltage sensor, and reset means for preventing motor operation when battery voltage is less than a predetermined voltage value.

12. Apparatus in accordance with claim 1 wherein the source of electrical power is a battery carried by the trailer.

13. Apparatus in accordance with claim 1 wherein the source of electrical power is a battery carried by the tractor.

14. Apparatus in accordance with claim 1 wherein the source of electrical power is a battery and includes a solar collector panel connected with the battery for maintaining a charge on the battery.

15. Apparatus for extending and retracting a landing gear of a truck trailer that includes a trailer frame, said apparatus comprising:

(a) a pair of landing gear legs extending downwardly from the trailer frame, adjacent an end of the frame, wherein the landing gear legs are operable to support the forward end of the trailer frame and are movable between an extended position and a retracted position;

(b) an electric motor carried by the trailer frame for extending and retracting the landing rear legs;

(c) a first, seed reduction gearbox carried by the trailer frame and operably coupled with the electric motor and with the trailer landing gear to transmit rotary power from the electric motor to the landing gear legs to selectively cause the legs to extend and retract;

(d) a motor control system for controlling the access to and the operation of the motor, wherein the motor control system includes motor current measuring means for measuring the current drawn by the motor during motor operation, and a motor overcurrent timer responsive to the current drawn by the motor for imposing a motor delay before the motor can again be energized;

(e) a keypad for entering access information and control instructions to the motor control system;

(f) a second motor current timer responsive to a second motor overcurrent that occurs within a predetermined multiple overcurrent time interval, and a reset for resetting the motor control and disabling the motor control for a predetermined disable time period; and (g) a source of electrical power coupled with the motor control system.

16. Apparatus for extending and retracting a landing gear of a truck trailer that includes a trailer frame, said apparatus comprising:

(a) a pair of landing gear legs extending downwardly from the trailer frame adjacent an end of the frame, wherein the landing gear legs are operable to support the forward end of the trailer frame and are movable between an extended position and a retracted position;

(b) an electric motor carried by the trailer frame for extending and retracting the landing gear legs;

(c) a first, speed reduction gearbox carried by the trailer frame and operably coupled with the electric motor and with the trailer landing gear to transmit rotary power from the electric motor to the landing gear legs to selectively cause the legs to extend and retract;

(d) a motor control system for controlling the access to and the operation of the motor, wherein the motor control system includes an access code entry timer for measuring a time delay between entry of individual steps in a multi-step access code, and an activity timer for measuring a time delay between acceptance of an entered access code and a subsequent activation of the electric motor, and wherein the motor control includes motor current measuring means for measuring the current drawn by the motor during motor operation, and a motor overcurrent timer responsive to the current drawn by the motor for imposing a motor delay before the motor can again be energized, and a second motor current timer responsive to a second motor overcurrent condition that occurs within a predetermined multiple overcurrent time interval, and means for resetting the motor control and disabling the motor control for a predetermined disable time;

(e) a keypad for entering access information and control instructions to the motor control system; and (f) a source of electrical power coupled with the motor control system.

17. Apparatus in accordance with claim 16 wherein the motor control system includes a motor operation timer for measuring the time the motor is in continuous operation, and reset means operable in response to a motor operating time that exceeds a preset motor operating time to prevent motor operation for a predetermined motor off time.

18. Apparatus in accordance with claim 17 wherein the motor control system includes a battery voltage sensor, and reset means for preventing motor operation when battery voltage is less than a predetermined voltage value.

* * * * *